(12) United States Patent
Booth et al.

(10) Patent No.: US 7,917,665 B1
(45) Date of Patent: Mar. 29, 2011

(54) METHOD AND SYSTEM FOR MINIMIZING UNNECESSARY TOPOLOGY DISCOVERY OPERATIONS BY MANAGING PHYSICAL LAYER STATE CHANGE NOTIFCATIONS IN STORAGE SYSTEMS

(75) Inventors: Wayne Booth, San Jose, CA (US); Melvin McGee, Gilroy, CA (US)

(73) Assignee: NetApp, Inc., Sunnyvale, CA (US)

( * ) Notice: Subject to any disclaimer, the term of this patent is extended or adjusted under 35 U.S.C. 154(b) by 467 days.

(21) Appl. No.: 12/110,138

(22) Filed: Apr. 25, 2008

(51) Int. Cl.
*G06F 13/00* (2006.01)

(52) U.S. Cl. .............. 710/15; 710/14; 710/16; 710/17; 710/18; 710/19; 714/43; 714/47; 714/49

(58) Field of Classification Search .............. 710/14–19; 714/43, 47, 49
See application file for complete search history.

(56) References Cited

U.S. PATENT DOCUMENTS

| | | | |
|---|---|---|---|
| 5,872,932 A * | 2/1999 | Schettler et al. | 709/226 |
| 7,523,359 B2 * | 4/2009 | Richards et al. | 714/49 |
| 2008/0005621 A1 * | 1/2008 | Bedwani et al. | 714/43 |

* cited by examiner

*Primary Examiner* — Tammara Peyton
(74) *Attorney, Agent, or Firm* — Klein, O'Neill & Singh, LLP (57) ABSTRACT

Method and system is provided where PHY state change (PHY CHANGE) notifications from one or more PHYs in a storage infrastructure are monitored as a potential error condition. The rate of PHY CHANGE notifications is monitored to determine if the rate of PHY CHANGE notifications may cause a loss of service or degrade I/O performance. An excessive rate of PHY CHANGE notification that may cause a loss of service is detected by comparing a current PHY CHANGE count with burst threshold value. The current PHY CHANGE count is also compared to an operational threshold value to detect if the rate of PHY CHANGE notification may result in degradation of overall I/O performance. If the PHY CHANGE count for a PHY equals or exceeds the burst threshold value or the operational threshold value, then the PHY is disabled.

15 Claims, 7 Drawing Sheets

METHOD AND SYSTEM FOR MINIMIZING UNNECESSARY TOPOLOGY DISCOVERY OPERATIONS BY MANAGING PHYSICAL LAYER STATE CHANGE NOTIFCATIONS IN STORAGE SYSTEMS

BACKGROUND

1. Technical Field

The present disclosure relates to storage systems.

2. Related Art

Information in storage infrastructures today is stored in various storage devices that are made accessible to clients via computing systems. A typical storage infrastructure may include a storage server and a storage subsystem having an expander device (for example, a Serial Attached SCSI (SAS) Expander) and a set of mass storage devices, such as magnetic or optical storage based disks or tapes. The mass storage devices may comply with various industry protocols and standards, for example, the SAS and Serial Advanced Technology Attached (SATA) standards.

The storage server is a special purpose processing system that is used to store data on behalf of one or more clients. The storage server stores and manages shared files at the mass storage device.

The expander device (for example, a SAS Expander) is typically used for facilitating communication between plurality of mass storage devices within a storage subsystem. The expander device in one storage subsystem may be operationally coupled to expander devices in other storage subsystems. The expander device typically includes one or more ports for communicating with other devices within the storage infrastructure. The other devices also include one or more ports for communicating within the storage infrastructure.

The term port (may also be referred to as "PHY") as used herein means a protocol layer that uses a transmission medium for electronic communication within the storage infrastructure. A port typically includes a transceiver that electrically interfaces with a physical link and/or storage device.

For executing input/output ("I/O") operations (for example, reading and writing data to and from the mass storage devices), a storage server typically uses a host bus adapter ("HBA", may also be referred to as an "adapter") to communicate with the storage infrastructure devices (for example, the expander device and the mass storage devices). To effectively communicate with the storage infrastructure devices, the adapter performs a discovery operation to discover the various devices operating within the storage infrastructure at any given time. This operation may be referred to as "topology discovery". A topology discovery operation may be triggered when a PHY changes its state and sends a PHY state change notification. A change in PHY state means, whether a PHY is ready or "not ready" to communicate. A PHY may change its state due to various reasons, for example, due to problems with cable connections, storage device connections or due to storage device errors within a storage subsystem.

When a PHY changes its state, typically, a notification is sent out to other devices, for example, to the adapter and the expander device. After receiving a PHY state change notification, the adapter performs the topology discovery operation. A certain number of PHY state change notifications are expected during normal storage infrastructure operations. However, if a PHY starts repeatedly sending PHY state change notifications, then instead of efficiently executing operations, the adapter in response to the notifications repeatedly performs discovery operations. This may result in complete loss of operation execution is negatively impacted because the adapter resources are used for discovery operations rather than solely executing I/O operations.

In conventional storage infrastructures in general, and in storage subsystems in particular, a PHY state change notification is handled like an ordinary event whose purpose is to trigger a topology discovery operation. PHI state change notifications are typically, not analyzed as an error condition or as a potential error indicator that may trigqer another action besides the standard, topology discovery operation.

Users today expect to efficiently perform operations to access information stored at storage devices with minimal disruption or loss of service. Therefore, there is a need for efficiently managing PHY state change notifications in storage infrastructures so that one can reduce the chances of loss of service in performing I/O operations and disruption in executing I/O operations.

SUMMARY

In one embodiment, a method and system is provided for monitoring a rate of port state change notifications received from one or more ports within a storage infrastructure as a potential error indicator (i.e. as an error condition). As described below, in treating the rate of port start change notifications as an error condition, one can disable a disruptive port that repeatedly sends port state change notifications.

The term port (may also be referred to as "PHY") means a protocol layer that uses a transmission medium for electronic communication within the storage infrastructure. A port typically includes a transceiver that electrically interfaces with a physical link and/or storage device.

The rate of port state change notifications means number of port state change notifications sent by a port within a time interval. A port typically sends a port state change notification when there is a change in port state (for example, if the port is "ready" or "not ready"). The rate at which port state change notifications are received (for example, by an expander device) is monitored to determine if the port state change notifications may result in a loss of service or may slow down the overall execution of I/O operations.

An excessive rate of port state change notification that may cause a loss of service is detected by comparing a current port state change count with a burst threshold value (may also be referred to as a first threshold value). The burst threshold value is designed to monitor excessive port change notifications that may result in a loss of service. The loss of service occurs because host bus adapters within a storage infrastructure continuously performs topology discovery in response to the excessive port change notifications, and hence, may not be able to issue new I/O commands. The burst threshold value may be programmable. The threshold value is set based on the overall operating environment of the storage infrastructure.

The current port state change count is also compared to an operational threshold value (may also be referred to as a second threshold value) to detect if the rate of port state change notification may negatively impact overall execution of I/O operations. The operational threshold value is used to monitor typical port change notifications that are expected during normal storage subsystem operation. The operational threshold value is used to detect a condition where the rate of the typical port change notifications increase to a level that may cause degradation in overall I/O performance without resulting a complete loss of service. The operational threshold value may be programmable. The operational threshold value is set based on the overall operating environment of the storage infrastructure.

The port sending port state change notifications is disabled; if the rate of port state change notifications exceeds either one or both of the threshold value and the second threshold value. This reduces disruption within the storage infrastructure and minimizes unnecessary topology discovery operations.

The embodiments disclosed herein have various advantages. In one aspect, because a port state change is monitored as a potential error, a port that is disruptively changing state can be effectively identified and isolated. This reduces any instability that a port with a high rate of state change may cause in a storage infrastructure. By reducing instability, one can reduce overall service maintenance costs in operating a storage infrastructure.

This brief summary has been provided so that the nature of this disclosure may be understood quickly. A more complete understanding of the disclosure can be obtained reference to the following detailed description of the various embodiments thereof in connection with the attached drawings.

BRIEF DESCRIPTION OF THE DRAWINGS

The foregoing features and other features will now described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Definitions

The following definitions are provided as they are typically (but not exclusively) used in storage/computing environment, implementing the various adaptive embodiment described herein.

"Burst Threshold" (or a first threshold) means a threshold value used for monitoring a rate of PHY CHANGE notifications. The burst threshold value is designed to monitor excessive PHY CHANGE notifications that may result in loss of service within a storage system. The loss of service occurs because host bus adapters within a storage system continuously perform discovery in response to the excessive PHY CHANGE notifications, and hence, may not be able to issue new I/O commands.

"Operational Threshold" (or second threshold) means a threshold value that may be used to monitor typical PHY CHANGE notifications that are expected during normal storage system operation. The operational threshold value is use detect a condition where the rate of the typical PHY CHANGE notifications increase to a level that may cause degradation in overall I/O performance without resulting in a complete loss of service.

"PHY" means a protocol layer that uses a physical transmission medium for electronic communication within storage system infrastructure. PHY includes a transceiver that electrically interfaces with a physical link and/or storage device, as well as with the portions of a protocol that encodes data and manages reset sequences. PHY includes, but is not limited to, the PHY layer as specified in the SAS and SATA standards. In the SAS/SATA standards, a logical layer of protocols includes PHI. Each PHY resides in a SAS/SATA device and is configured for moving data between the SAS/SATA device and other devices coupled thereto. Each PHY that resides in a device example, a storage device, expander and others) includes a PHY identifier (for example, a port identifier or Port ID) unique to such device.

"PHY CHANGE" means an event that may result in a PHI state change. When a PHI changes state, the PHI may broadcast a primitive indicating the state change. The broadcast format will depends on the protocol used by the PHI device. For example, in a SAS environment, a BROADCAST (CHANGE) primitive is used to communicate PHY CHANGE.

"SAS" means Serial Attached SCSI, a multi-layer serial communication protocol direct attached storage devices, including hard drives, CD-ROMs, tape drives and other devices. A SAS device is a device that operates according to the SAS specification, such as SAS-2, Revision 12, published by the T10 committee on Sep. 28, 2007, incorporated herein by reference in its entirety.

"SAS Expander" is a device to facilitate communication between large numbers of SAS devices. SAS Expanders may include one or more external expander ports.

"SATA" means Serial Advanced Technology Attachment, standard protocol, used for transferring data to and from storage devices. The SATA specification is published by the Serial ATA International Organization (SATA-IO) and is incorporated herein by reference in its entirety.

In one embodiment, a method and system is provided where a rate of PHY CHANGE notification in a storage infrastructure is monitored as a potential error indicator (i.e. as an error condition). The rate of PHY CHANGE notifications is monitored to determine if an excessive rate of PHY CHANGE notifications may result in a loss of service or may degrade overall I/O performance. The excessive rate of PHY CHANGE notification that may cause a loss of service is detected by comparing a current PHY CHANGE count with a burst threshold value. The rate of PHY CHANGE notifications is monitored to determine if an excessive rate of PHY CHANGE notifications may result in a loss of service or may degrade I/O performance to unacceptable levels. The excessive rate of PHY CHANGE notification that may cause a loss of service is detected by comparing a current PHY CHANGE count with a burst threshold value (may also be referred to as a first threshold value).

In one embodiment, an expander device within a storage subsystem tracks a current count of PHY CHANGE notifications. The PHY CHANGE count in a current "burst" window is compared with the burst threshold value. If the current count exceeds (or equals, used interchangeably) the burst threshold value, then a PHY is considered too disruptive and is disabled.

The current count is also compared to the operational threshold value. If the PHY CHANGE count in a current "operational" window exceeds (or equals, used interchangeably) the operational threshold value, then the disruptive PHY is disabled. Both the burst threshold value and the operational threshold value are programmable. The threshold values may be set based on the overall operating environment of the storage infrastructure.

To facilitate an understanding of the various embodiments, the general architecture and operation of a network storage system will first be described. The specific architecture and operation of the various embodiments will then be described with reference to general architecture.

Figure 1A:
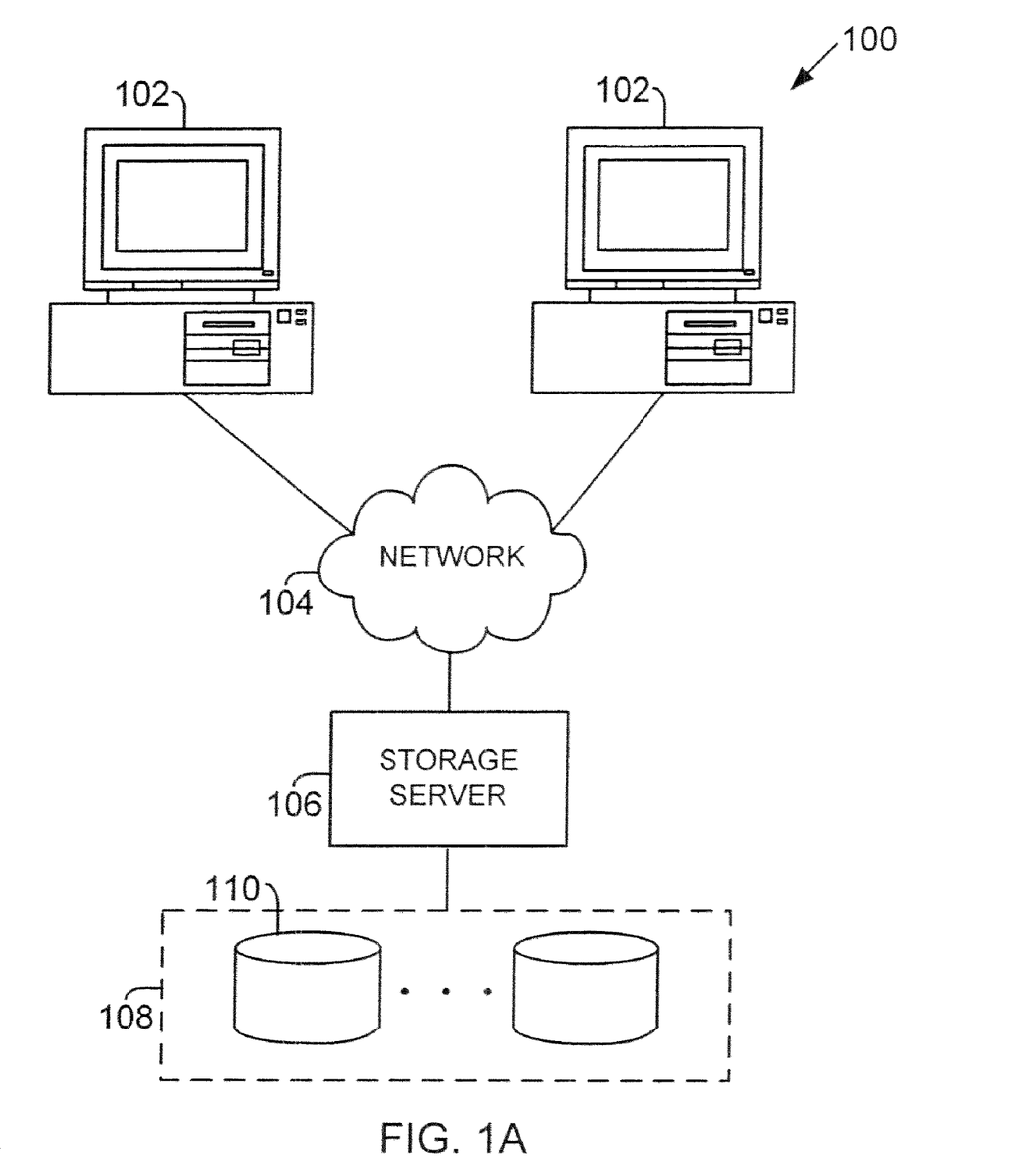
FIG. 1A shows a block diagram of a network system using the error management methodology of the present disclosure.

Network System:

FIG. 1A illustrates an example of a system 100 in which an embodiment present disclosure may be implemented. The various embodiments described herein are not limited to any particular environment, and may be implemented in various storage and network environments.

In the present example, the system 100 includes a storage server 106. The storage server 106 is operationally coupled to one or more storage subsystems 108, each which includes a set of mass storage devices 110. Storage server 106 is also accessible to a set of clients 102 through a network 104, such as a local area network (LAN) or other type of network. Each of the clients 102 may be, for example, a conventional personal computer (PC), workstation, or any of the other type of computing system or device.

Storage server 106 manages storage subsystem 108. Storage server 106 may receive and respond to various read and write requests from clients 102 directed to data stored in, or to be stored in storage subsystem 108.

It is noteworthy that storage server 106 support both file based and block based storage requests (for example, Small Computer Systems Interface (SCSI) requests).

The mass storage devices 110 in the storage subsystem 108 include magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data. In one embodiment, storage subsystem 108 may include one or more shelves of storage devices. For example, such shelves may each take the form of one of the subsystems shown in FIGS. 2A and 3 and described below.

Storage server 106 may have a distributed architecture; for example, it may include separate N-module (network module) and D-module (data module) components (not shown). In such an embodiment, the N-module is used to communicate with clients 102, while the D-module includes the file system functionality and is used to communicate with storage subsystem 108.

In another embodiment, storage server 106 may have an integrated architecture, where the network and data components are all contained in a single box or unit. Furthermore, storage server 106 may be coupled through a switching fabric to other similar storage systems (not shown) that have their own local storage subsystems. In this way, various storage subsystems may form a single storage pool, to which any client of any of the storage systems has access.

Figure 1B:
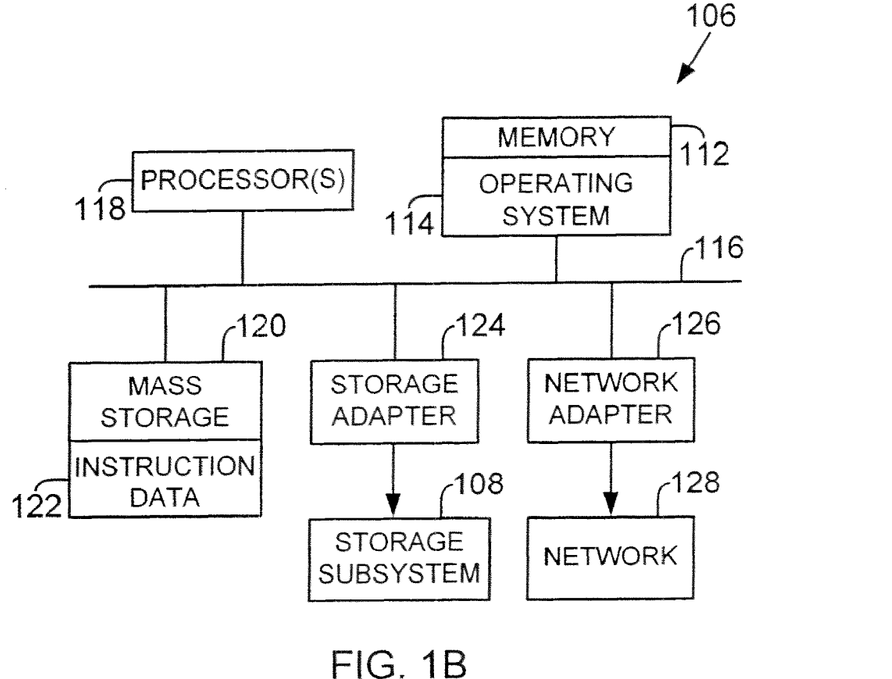
FIG. 1B shows an example of a storage server architecture used in the system of FIG. 1A.

Storage Server Architecture:

FIG. 1B illustrates an example of the storage server 106 architecture that may be used with an embodiment of to present disclosure. It is noteworthy that storage server 106 may be implemented in any desired environment and may incorporate any one or more of the features described below.

Storage server 106 includes one or more processors 118 and memory 112 coupled to an interconnect 116. The interconnect 116 shown in FIG. 18 is an abstraction that represents any one or more separate physical buses, point-to-point connections, or both connected by appropriate bridges, adapters, or controllers. The interconnect 116, therefore, may include, for example, a system bus, a Peripheral Component Interconnect (PCI) bus, PCI-X bus, PCI-Express, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

Processor(s) 118 may include central processing units (CPUs) of storage server 106 that control the overall operation of storage server 106. In certain embodiments, processor(s) 118 accomplish this by executing program instructions stored in memory 112. Processor(s) 118 may be, or may include, one or more programmable general-purpose or special-purpose microprocessors, signal processors (DSPs), programmable controllers, application specific integrated circuits (ASICs), programmable logic devices (PLDs), or the like, or a combination of such devices.

Memory 112 is, or includes, the main memory for storage server 106. Memory 112 represents any form of random access memory (RAM), read-only memory (ROM), flash memory, or the like, or a combination of such devices. In use, memory 112 stores, among other things, the operating system 114 of storage server 106. An example of an operating system 114 is the Netapp® Data ONTAP™ operating system available from NetApp, Inc., the assignee of the present application.

Processor(s) 118 mar be operationally coupled to one or more internal mass storage devices 120, a storage adapter 124 and a network adapter 126. The internal mass storage devices 120 may be, or may include, any medium for storing large volumes of instructions and instruction data 122 in a non-volatile manner, such as one or more magnetic optical-based disks.

The storage adapter 124 allows storage server 106 to access the storage subsystem 108 and may be, for example, a SAS adapter, a Fibre Channel adapter or a SCSI adapter. The storage adapter 124 may interface with a D-module (not shown) portion of storage server 106.

Network adapter 126 provides storage server 106 with the ability to communicate with remote devices, such as clients 102 (FIG. 1A), over a network 128 and may be, for example, an Ethernet adapter. The network adapter 126 may interface with an N-module portion of storage server 106.

Figure 1C:
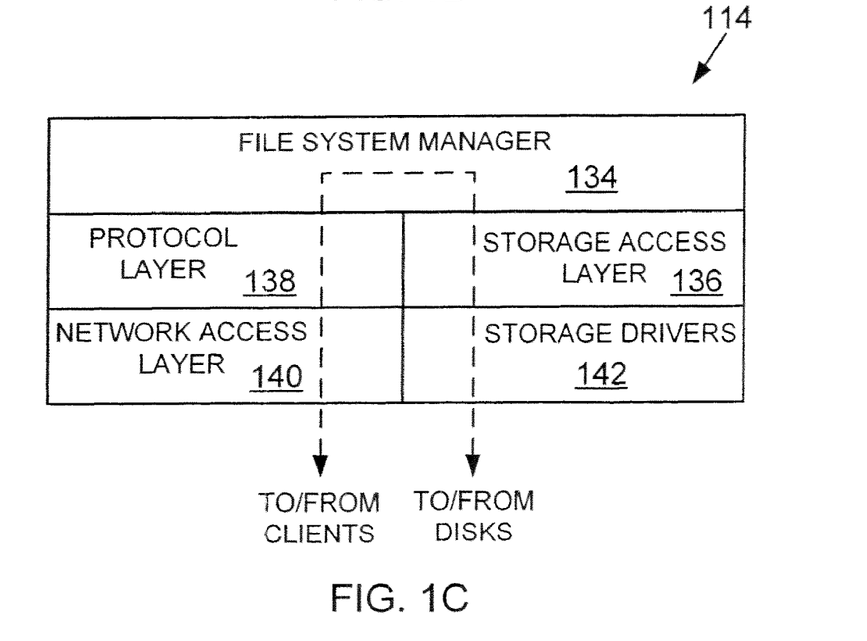
FIG. 1C shows an example of an operating system used by the storage server of FIG. 1B.

Operating System Architecture:

FIG. 1C illustrates an example of operating system 114 for storage server 106 used according to one embodiment of the present disclosure. In one example, operating system 114 may be installed on storage server 106. It is noteworthy that operating system 114 may be used in any desired environment and incorporates any one or more of the features described herein.

In one example, operating system 114 may include several modules, or "layers." These layers include file system manager 134 that keeps track of a directory structure (hierarchy) of the data stored in a storage subsystem and manages read/write operations, i.e. executes read/write operations on disks in response to client 102 requests.

Operating system 114 may also include a protocol layer 138 and an associated network access layer 140, to allow storage server 106 to communicate over a network with other systems, such as clients 102. Protocol layer 138 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 140 may include one or more drivers, which implement one or more lower-level protocols to communicate over the network, such as Ethernet. Interactions between clients 102 and mass storage devices 120 (e.g. disks, etc.) are illustrated schematically as a path, which illustrates the flow of data through operating system 114.

The operating system 114 may also include a storage access layer 136 and an associated storage driver layer 14 to allow storage server 106 to communicate with a storage subsystem. The storage access layer 136 may implement a higher-level disk storage protocol, such as RAID (redundant array of inexpensive disks), while the storage driver layer 142 may implement a lower-level storage device access protocol, such as Fibre Channel Protocol (FCP) or SCSI. In one embodiment, the storage access layer 136 may implement a RAID protocol, such as RAID-4 or RAID-DP™ (RAID double parity for data protection provided by NetApp, Inc., the assignee of the present disclosure).

Figure 2A:
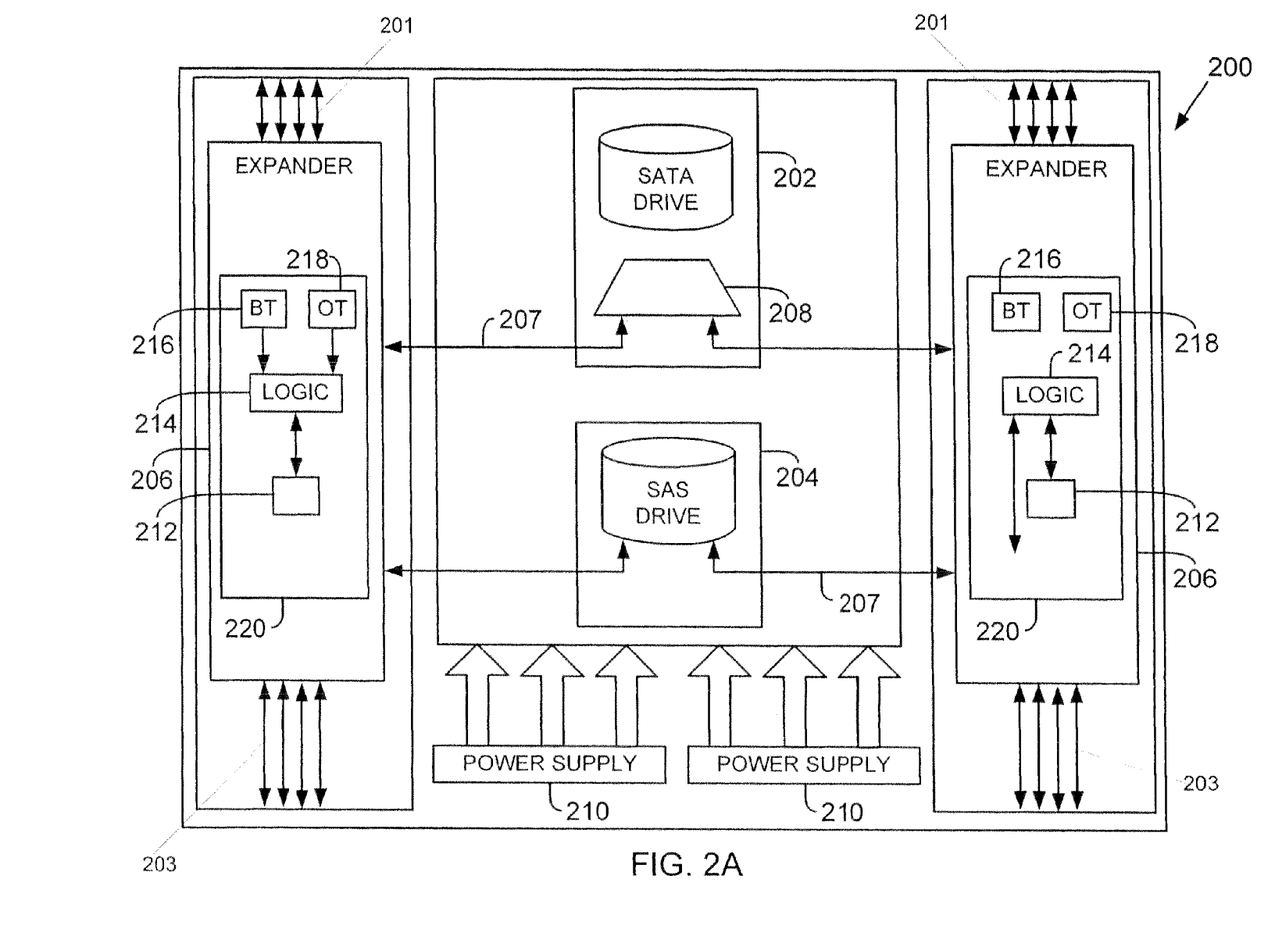
FIG. 2A shows an example of a storage subsystem for monitoring PHY state change notifications, according to one embodiment.

Storage Subsystem:

FIG. 2A illustrates a "just a bunch of disks" (JBOD) type storage sub-system 200 (Similar to 108, FIG. 1A) (may also be referred to as storage sub-system 200) for implementing the adaptive embodiments of the present disclosure. In one embodiment, storage sub-system 200 may represent one of multiple "shelves" where each shelf includes a plurality of storage devices, for example, one or more SATA storage devices 202, and/or one or more SAS storage devices 204. Storage devices 202 and 204 may communicate with a pair of expanders 206 via a plurality of links 207. As an option, the SATA storage devices 202 may communicate with the expanders 206 via a multiplexer (Mux) 208.

While two expanders 206 and specific types of storage devices are shown in FIG. 2A, it should be noted that other embodiments are contemplated involving a single expander 206 and other types of storage devices. While not shown, expanders 206 of the storage sub-system 200 may be daisy-chained or otherwise connected to other sub-systems (not shown) via links 201 and 203 to form an overall storage system. The rate of PHY CHANGE monitoring process flow described below is applicable to all the PHYs in the daisy chained storage sub-systems.

Storage sub-system 200 may be powered by a plurality of power supplies 210 that may be coupled to storage devices 202 and 204, and expanders 206

Monitoring PHY CHANGE Notifications:

In a storage infrastructure (which includes a storage subsystem), for example, the SAS domain shown in FIG. 2A, whenever a PHY changes state, a BROADCAST (CHANGE) primitive is propagated throughout the SAS domain. The propagation allows an expander and a storage server to detect any change in topology within the storage infrastructure. The change in topology may occur due to various reasons, for example, when a PHY is enabled or disabled, when a PHY receives a LINK_RESET primitive (i.e. to reset a link (for example, 207), when a PHY receives a HARD-RESET primitive, when a device or cable is added or removed, or when a device is powered up or down.

Although topology discovery may occur while an operation is in progress, a host adapter consumes resources to discover/rediscover the topology, each time the host adapter receives the BROADCAST (CHANGE) primitive. Furthermore, the host adapter may not issue any new I/O commands while topology discovery operations are in progress. Excessive discovery operations due to excessive PHY CHANGE notification wastes time and resources. Excessive PHY CHANGE notifications may cause loss of service or loss of performance in servicing I/O requests.

Excessive PHY CHANGE notifications may occur due to problems with hardware and firmware within the SAS domain. Some of these problems may occur due to the cables connecting storage devices, drive connectors, or firmware related errors in storage devices.

In one embodiment, PHY CHANGE notifications are monitored, analyzed and handled as a potential error indicator (i.e. an error condition) unlike conventional systems, where a PHY CHANGE notification is simply viewed as an event that triggers a topology discovery operation. The adaptive embodiments disclosed herein, monitor the rate at which PHY CHANGE notifications are received within a time window described below with respect to FIGS. 2C and 4.

In one embodiment, expander 206 monitors the rate of PHY CHANGE notifications to determine if the rate is excessive. Expanders 206 may include one or more counters 212 to count PHY CHANGE notifications as they are received during storage sub-system 200 operations. In one embodiment, counter 212 may be implemented within firmware 220. Firmware 220 includes executable code for controlling overall expander 206 operations. In another embodiment, counter 212 may also be implemented in hardware, or a combination of hardware and software.

Expander 206 includes logic 214 that monitors counter 212 values within a time interval, as described below. Counter 212 provides an input logic 214 that monitors the rate of PHY CHANGE notifications with respect to a burst threshold value ("BT") 216 and an operational threshold value ("OT") 218. The burst threshold value 216 is used by expander 206 to disable link or PHY that may result in a loss of service. If a current counter 212 value exceeds the programmed burst threshold value 216 then a PHY (or the link associated with the PHY) is disabled.

The operational threshold value 218 may also be used by expander 206 to disable a link whose performance level is degraded due to PHY CHANGE notifications. The operational threshold value 218 is programmed with the assumption that a certain number of PHY CHANGE notifications can be tolerated, as they may be useful for topology discovery, even though they may cause some degradation in I/O performance. However, if the rate of PHY CHANGE notification exceeds the operational threshold value 218, then one can assume that the I/O performance degradation is beyond an acceptable limit. In such an instance, expander 206 disables the PHY that is broadcasting the PHY CHANGE primitive(s).

Figure 2B:
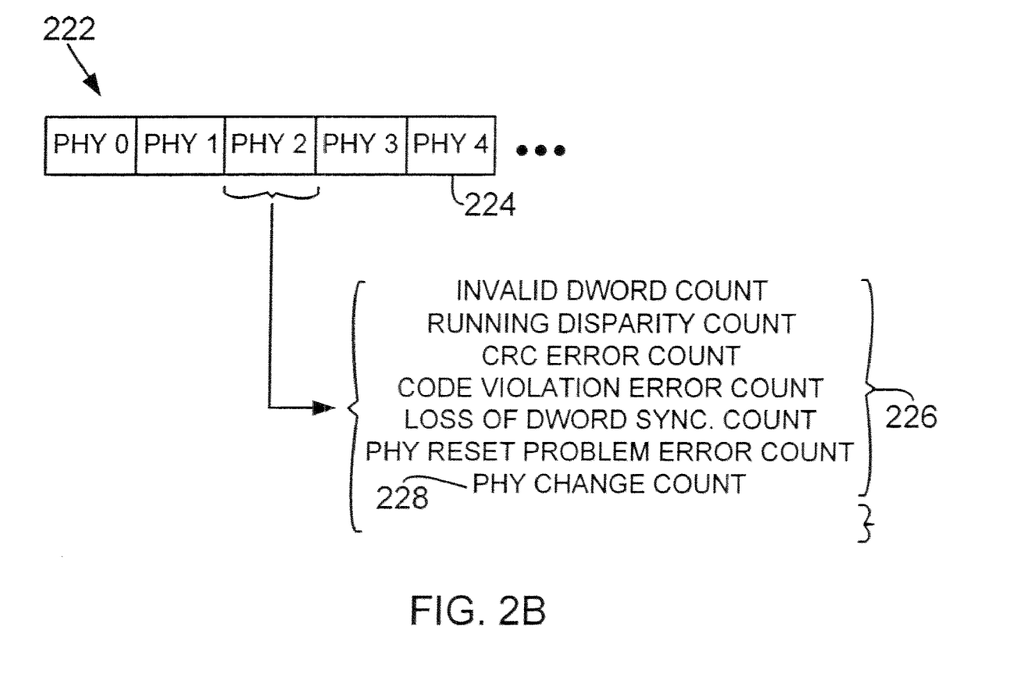
FIG. 2B shows an example of a data structure used for monitoring PHY CHANGE count as a potential error, according to one embodiment.

FIG. 2B illustrates an example of a data structure 222 for tracking error events and other information, in accordance with one embodiment. As an option, the data structure 222 may be used to track error events in connection with the method of FIG. 4, and/or the sub-systems 200, 300 of FIGS. 2A and 3. However, it should be noted that the data structure 222 may be used in any desired environment.

Data structure 222 may be defined as an array of per-PHY error counters 224 that in one embodiment are maintained in software. Further, an array of the per-PHY error counters 224 may include, but are not limited to, the error counter values shown in 226.

As further shown, a plurality of different counters 226 are used for counting actual error events of different types.

Examples of such types may include, but are certainly not limited to an invalid DWORD count, a running disparity count, a cyclical redundancy check (CRC) count, code violation error count, a loss of DWORD synchronization count, a physical reset problem error count, etc.

Data structure 226 includes a PHY CHANGE counter 228 (similar to counter 2 in FIG. 2A) that counts a number of PHY CHANGE events. In one embodiment, a rate of change of counter 228 values is monitored. The rate of change is compared with the burst threshold and operational threshold values. Based on the comparison, a PHY may be disabled, as described below.

Figure 2C:
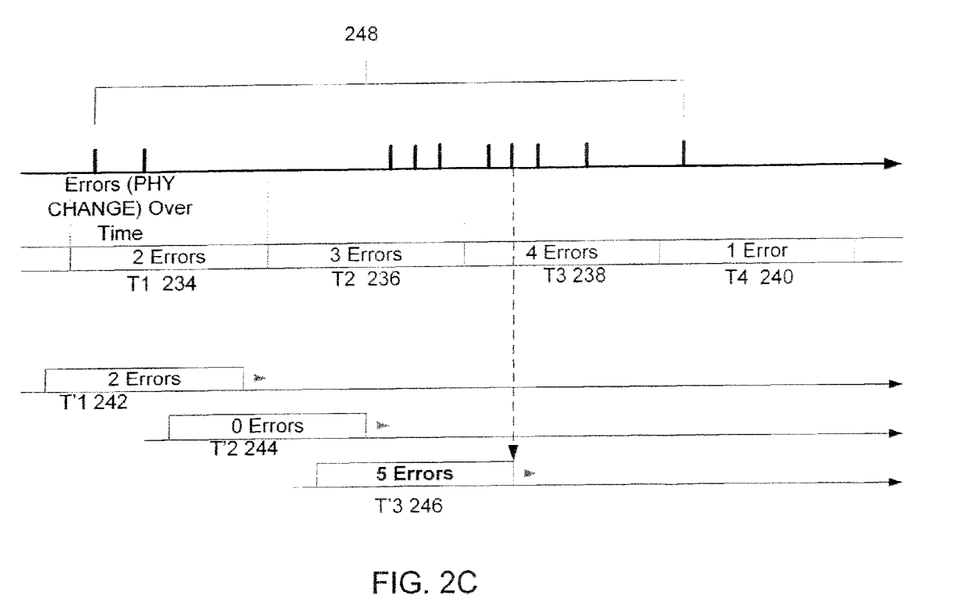
FIG. 2C shows time window examples used monitoring the rate of PHY state change notifications, according to one embodiment.

FIG. 2C shows an example of monitoring the rate of PHY CHANGE notification as potential error indicators with respect to non-overlapping and fixed time windows and an overlapping (sliding) time window. Assume that a threshold value of 5 errors for a time window is set. This means that if the number of PHY CHANGE notifications equal or exceed 5 PHY CHANGE notifications within a time window, the PHY sending the notifications is disabled. The received PHY CHANGE notifications are shown as vertical lines with item 248. T1, 234, T2 236, T3 238 and T4 240 are fixed, non-overlapping time windows (or intervals). As shown in FIG. 2C, the number of notifications received during the fixed time windows does not exceed 5 PHY CHANGE notifications. Therefore, his example, under the fixed non-overlapping, time window scheme, the PHY may not be disabled since the threshold value is not reached.

In an alternative embodiment, time intervals T'1 242, T'2 244 and T'3 246 are sliding, i.e. overlapping. In the sliding time window scheme, during T'246, 5 PHY CHANGE notifications are received. This equals the set threshold value of 5 and hence the PHY is disabled.

As shown in FIG. 2C, a fixed non-overlapping time window scheme versus a sliding time window scheme may yield a different result. The time intervals for a burst threshold value ("burst window) may be different than a time window for the operational threshold value ("operational window"). From an operational perspective, operational window is longer than the burst window.

It is noteworthy that the adaptive embodiments disclosed herein are not limited to any particular threshold value or time interval value. Furthermore, the embodiments disclosed herein are not limited to any particular time window scheme, i.e. fixed or sliding time window scheme.

Figure 3:
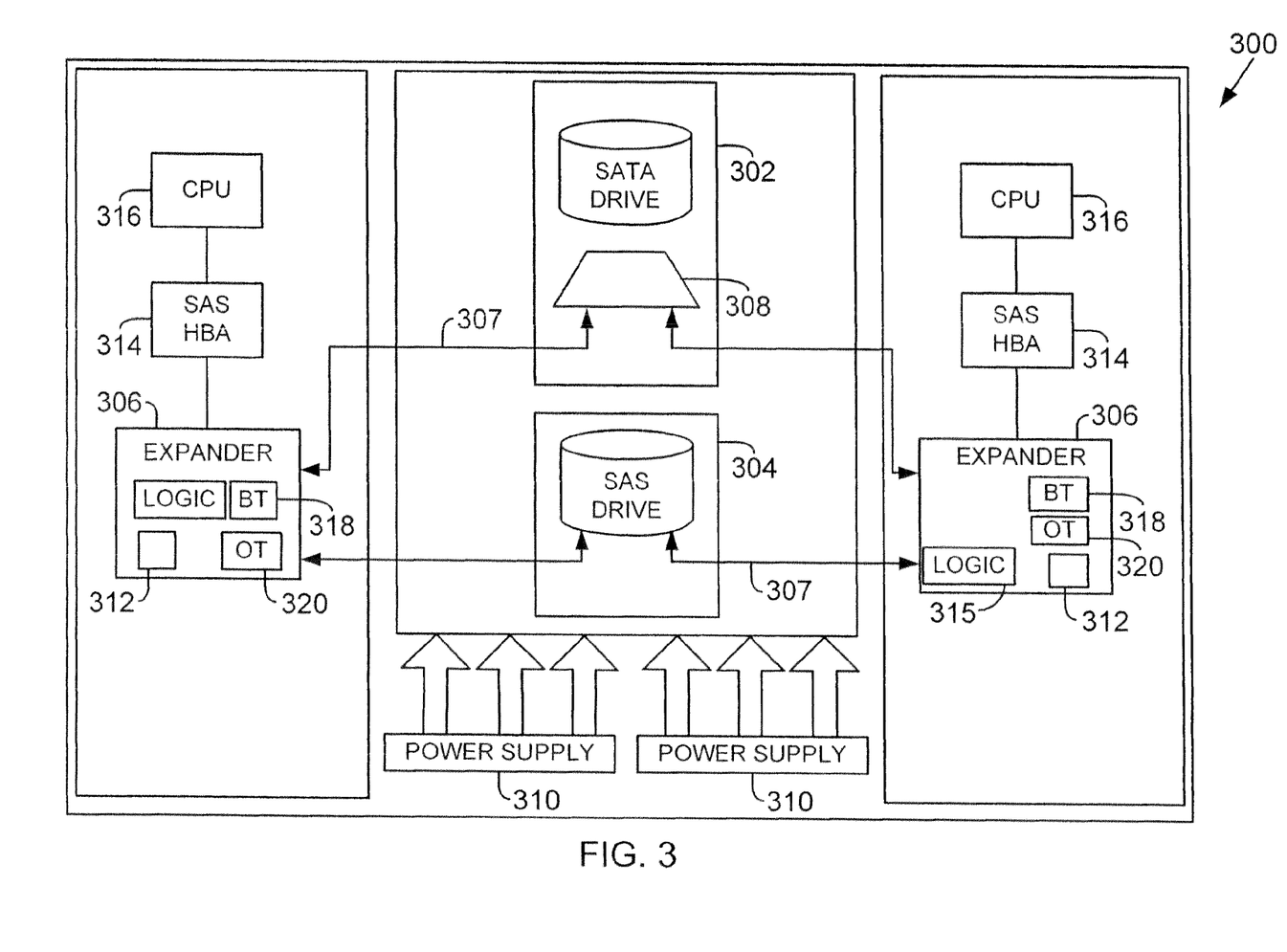
FIG. 3 shows another example of a storage subsystem used according to one embodiment.

RAID System:

FIG. 3 illustrates a RAID system configuration 300, which may use the methodology for rate of PHY CHANGE monitoring as a potential error described above respect to FIGS. 2A-2C and described below with respect to FIG. 4, in accordance with yet another embodiment. It is noteworthy that the adaptive aspects disclosed herein may be implemented in any RAID or similar system.

RAID system 300 includes expanders 306 (similar to expander 206, FIG. 2A) that may be coupled to a dedicated SAS host bus adapter (SAS HBA) 314 which, in turn, is coupled to a central processing unit (CPU) 316.

RAID system 300 may include a plurality of storage devices. As shown, one or more SATA storage devices 302, and/or one or more SAS storage devices 304 may be provided. Storage devices (302, 304) may, in turn, communicate with a pair of expanders 306 via a plurality links 307. The SATA storage devices 302 may communicate with the expanders 306, SAS host bus adapters SAS HBA 314 and CPUs 316 via a multiplexer 308.

A plurality of power supplies 310 may be coupled the storage devices 302, 304), the HBA 314, and the PU 316 to supply power to system 300.

Similar to the embodiment of FIG. 2A, expanders 306 may be equipped with one or more counters 312 (similar to counter 212, FIG. 2A) for counting PHY CHANGE notifications propagated by storage devices (302, 304) via the links 307. Logic 315 functionality is similar to logic 14 described above. Burst threshold val 8 is similar to burst threshold value 216 and operational threshold value 320 is similar to operational threshold value 218.

Figure 4:
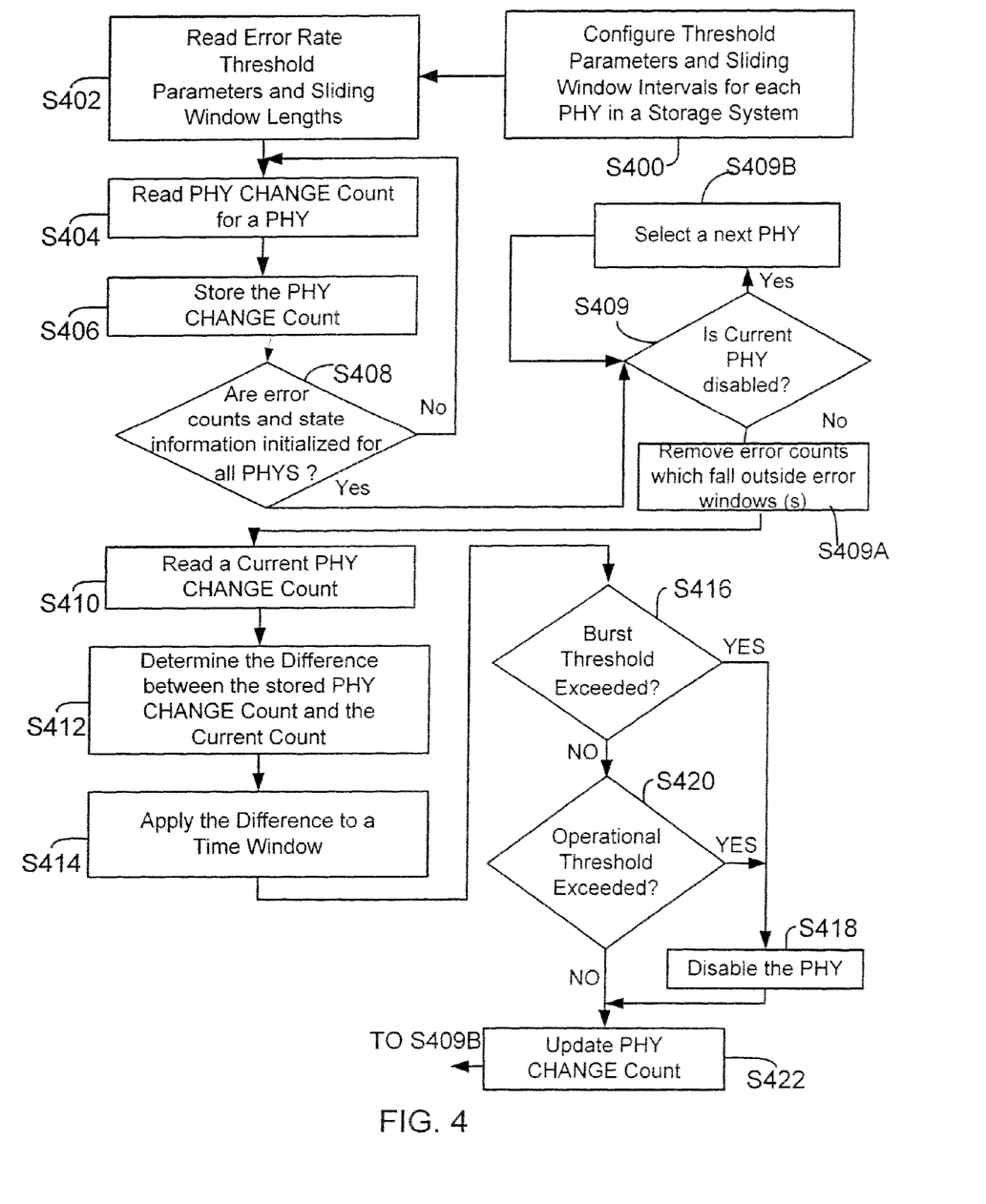
FIG. 4 shows a process flow diagram for monitoring PHY state change notifications, according to one embodiment.

Process Flow:

FIG. 4 shows a process flow diagram for monitoring a rate of PHY CHANGE notifications for plurality of PHYs, according to one embodiment. The process steps of FIG. 4 are described with respect to FIGS. 2A-2C, but are not limited to the systems of FIGS. 2A-2C.

The process starts in step 400, when a burst threshold value 216 and operational threshold value 218 are assigned for each PHY. The threshold values may be same for each PHY or may vary for individual PHYs. In one embodiment, default threshold values are set for the firmware of expander 206. However, storage server 106 may be used to alter the threshold values based on storage server 106 operating environment.

In step S402, when a storage system (for example, 200, FIG. 2A) is initialized, logic 214 reads the burst threshold values 216 and operational threshold values 218.

In step S404, logic 214 reads a PHY CHANGE count value from counter 212 as a current count. In step S406, logic 214 stores the current PHY count in a data structure maintained for each PHY (for example, the PHY CHANGE count in data structure 222).

In step S408, the process determines if all the PHY error counters and state information for the PHYs is initialized. An example of the per-PHY data structure is shown in FIG. 2B and described above. If not, the process reverts back to step S404.

After the initial PHY error counts and state information is obtained, in step S409, the process determines if a current PHY that is being monitored is disabled. In one embodiment, the process polls each PHY for monitoring the rate of PHY CHANGE notifications. If the current PHY is disabled, a next PRY is selected in step S409B and the process reverts back to step S409.

If the current PHY is not disabled, then in step S409A any error counts that may have fallen out of a time window from a previous polling cycle are removed.

In step S410, Logic 214 reads a current PHY CHANGE count when counter 212 is updated (i.e. when a PHY CHANGE notification is received).

In step S412, logic 214 determines the difference between the updated PHY CHANGE count and the stored count.

In step S414, logic 214 applies the difference current PHY CHANGE count within a time interval of a time window, for example, a sliding time window, described above with respect to FIG. 2C.

In step S416, logic 214 determines if the difference exceeds the burst threshold value for a time window. If yes, then the PHY is disabled in step S418.

If the burst threshold value is not exceeded, then in step S420, the difference is compared to operational threshold value 218. In one embodiment, the operational threshold value 218 has a longer time window interval than the time windows for burst threshold 216.

If the PHY CHANGE count difference exceeds the operational threshold value, then the PHY is disabled in step S418. In step S422, the PHY CHANGE count value is updated and stored in the PHY data structure 222. Thereafter, the process reverts back to step S409B to evaluate and monitor the rate of PHY CHANGE notifications for a next PHY. In one embodiment, the process steps of FIG. 4, periodically poll and cycle through the plurality PHYs to monitor the rate of PHY CHANGE notifications.

In one embodiment, PHY CHANGE notification is evaluated as a potential error, in addition to also being used as a discovery primitive as used by conventional systems. This allows one to identify and a disable the disruptive PHY. This reduces disruption within the storage infrastructure and minimizes unnecessary topology discovery operations.

The various embodiments disclosed herein have various advantages. In one aspect, because a port state change is monitored as a potential error, a port that is disruptively changing state can be effectively identified and isolated. This reduces any instability that a port with a high rate of state change may cause in a storage infrastructure. By reducing instability, one can reduce overall service and maintenance costs in operating a storage infrastructure.

While the present disclosure is described above with respect to what is currently considered its preferred embodiments, it is to be understood that the disclosure not limited to that described above. To the contrary, the disclosure is intended to cover various modifications and equivalent arrangements within the spirit and scope of the appended claims.

What is claimed is:

1. A method for monitoring a storage infrastructure with a plurality of storage devices and at least one interface device interfacing with the plurality of storage devices, comprising:
    assigning a first threshold value for monitoring a rate of physical layer ("PHY") state change notifications from a PHY coupled to a storage device via a link as a potential error indicator, where the PHY interfaces with the interface device;
    assigning a second threshold value for monitoring the rate of PHY state change notifications as a potential error indicator;
    maintaining a current count of PHY state change notifications;
    comparing the first threshold value with the current count of PHY state change notification;
    disabling the PHY when the rate of PHY state change notifications equals or exceeds the first threshold value;
    comparing the second threshold value with a current count of PHY state change notification; and
    disabling the PHY if the rate of PHY state change notifications equals or exceeds the second threshold value;
    wherein the first threshold value is used for monitoring the rate of PHY state change notifications within the storage infrastructure to avoid loss of service resulting from a disruptive PHY; and the second threshold value is used for disabling a disruptive PHY transmitting PHY state change notifications that degrades processing of input/output operations, instead of resulting in loss of service.

2. The method of claim 1, wherein firmware for the interface device monitors the rate of PHY state change notifications as the potential error indicator.

3. The method of claim 1, wherein the plurality of storage devices includes a Serial Attached Small Computer System Interface (SAS) based storage device.

4. The method of claim 1, wherein the plurality of storage devices includes a Serial Advanced Technology Attachment (SATA) based storage device.

5. The method of claim 1, wherein the interface device interfacing with the plurality of storage device is a Serial Attached Small Computer System Interface (SAS) based expander device.

6. A system, comprising;
    a plurality of storage devices operationally coupled to an interface device via a plurality of links; wherein the interface device monitors a rate of physical layer ("PHY") state change notifications as a potential error indicator by comparing a first threshold value to a current PHY state change count maintained by the interface device for a plurality of PHYs interfacing with the interface device; and a disruptive PHY is disabled if the current PHY state change count equals or exceeds the first threshold value; wherein the first threshold value is used for monitoring the rate of PHY state change notification within the system to avoid loss of service resulting from a disruptive PHY; and wherein the interface device compares a second threshold value with the current count of PHY state change notification: and disables a disruptive PHY if the current count of PHY state change notification equals or exceeds the second threshold value.

7. The system of claim 6, wherein the second threshold value is used for disabling a disruptive PHY transmitting PHY state change notifications that degrades processing of input/output operations, instead of resulting in loss of service.

8. The system of claim 6, wherein the plurality of storage devices includes a Serial Attached Small Computer System Interface (SAS) based storage device.

9. The system of claim 6, wherein the plurality of storage devices includes a Serial Advanced Technology Attachment (SATA) based storage device.

10. The system of claim 6, wherein the interface device interfacing with the plurality of storage device is a Serial Attached Small Computer System Interface (SAS) based expander device.

11. A method for monitoring a rate of physical layer ("PHY") state change notifications in a storage infrastructure, comprising:
    assigning a first threshold value for monitoring the rate of PHY state change notifications from a PHY coupled to a storage device via a link within the storage infrastructure as a potential error indicator;
    assigning a second threshold value for monitoring the rate of PHY state change notifications as a potential error indicator;
    maintaining a current count of PHY state change notifications;
    comparing the first threshold value with the current count of PHY state change notification;
    disabling the PHY when the rate of PHY state change notifications equals or exceeds the first threshold value;
    comparing the second threshold value with a current count of PHY state change notification; and
    disabling the PHY if the rate of PHY state change notifications equals or exceeds the second threshold value.

12. The method of claim 11, wherein the first threshold value monitors the rate of PHY state change notification within the storage infrastructure to avoid loss of service resulting from a disruptive PHY.

13. The method of claim 11, wherein the second threshold value is used for disabling a disruptive PHY transmitting PHY state change notifications that degrades processing of input/output operations, instead of resulting in loss of service.

14. The method of claim 11, wherein the storage device is a Serial Attached Small Computer System Interface (SAS) based storage device.

15. The method of claim 11, wherein the storage device is a Serial Advanced Technology Attachment (SATA) based storage device.

* * * * *